US008458546B2

(12) United States Patent
Mobin et al.

(10) Patent No.: US 8,458,546 B2
(45) Date of Patent: Jun. 4, 2013

(54) OVERSAMPLED CLOCK AND DATA RECOVERY WITH EXTENDED RATE ACQUISITION

(75) Inventors: Mohammad Mobin, Orefield, PA (US); Matthew Tota, Clinton, NJ (US); Gregory Winn, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 159 days.

(21) Appl. No.: 13/106,040

(22) Filed: May 12, 2011

(65) Prior Publication Data

US 2012/0290885 A1 Nov. 15, 2012

(51) Int. Cl.
*G06F 11/00* (2006.01)

(52) U.S. Cl.
USPC ............................ 714/744; 714/814; 375/355

(58) Field of Classification Search
USPC ........................... 714/744, 814, 815; 375/355
See application file for complete search history.

(56) References Cited

U.S. PATENT DOCUMENTS

| 2003/0095619 A1* | 5/2003 | Vallet et al. | 375/355 |
| 2005/0135527 A1* | 6/2005 | Masui et al. | 375/355 |
| 2006/0056498 A1* | 3/2006 | Clancy et al. | 375/219 |
| 2008/0187080 A1* | 8/2008 | Lee et al. | 375/355 |
| 2009/0109587 A1* | 4/2009 | Smith et al. | 361/86 |
| 2012/0093273 A1* | 4/2012 | Chen | 375/355 |

* cited by examiner

*Primary Examiner* — Yolanda L Wilson

(57) ABSTRACT

In described embodiments, a transceiver supports two or more rates using an oversampling clock and data recovery (CDR) circuit sampling high rate data with a predetermined CDR sampling clock. A timing recovery circuit detects and accounts for extra or missing samples when oversampling lower rate data. An edge detector detects each actual data symbol edge and provides for an edge decision offset in a current instant's block of samples. An edge error is generated from the previous instant's actual and calculated edges; and an edge distance between actual edges of the current and previous instants is generated. Filtered edge distance and error are combined to generate a calculated edge position for the data symbol edge for the current instant. The edge decision offset is applied to the current calculated edge position to identify a sample value to generate a decision for the data symbol to detect the current data value.

18 Claims, 5 Drawing Sheets

OVERSAMPLED CLOCK AND DATA RECOVERY WITH EXTENDED RATE ACQUISITION

BACKGROUND OF THE INVENTION

1. Field of the Invention

The present invention relates to communication transceiver clock and data recovery, and, in particular, to timing recovery when oversampling lower data rates.

2. Description of the Related Art

In many data communication applications, serializer and de-serializer (SerDes) devices facilitate the transmission between two points of parallel data across a serial link. Data at one point is converted from parallel data to serial data and transmitted through a communications channel to the second point where it received and converted from serial data to parallel data. One application for SerDes devices is related to the Universal Serial Bus (USB) specification that establishes communication between host controllers and multiple devices.

The USB standard currently includes three specifications: USB 1.x ("USB1"), USB 2.x ("USB2"), and USB 3.x ("USB3"), where "x" implies a particular version of the specification. USB1 specifies data transfer rates of 1.5 Mbps and 12 Mbps. USB2 specifies a higher data transfer rate of 480 Mbps, and USB3 specifies an even higher data transfer rate of 5 Gbps, termed a "SuperSpeed" bus. A SerDes device operating in accordance with USB3 desirably supports the lower speed specifications of USB1 and USB2, and so must support these data transfer rates (0.48 Gbps, 0.012 Gbps and 0.0015 Gbps). In addition, USB devices often interface with remote or network devices conforming to the Serial Advanced Technology Attachment (SATA) specification and their associated data stream rates. However, a SerDes device implementation supporting such a wide range of data transfer rates faces numerous technical challenges.

One component of a SerDes device is a clock and data recovery (CDR) circuit. The CDR extracts and reconstructs clock and data information from a single data stream that doesn't contain a clock signal during serial data transmission. The receiver of the data stream generates a signal, and then aligns sampling of the data stream with timing of detected transitions in the data stream based on a locally generated clock using a phase-locked loop. In operation at high data rates, SerDes devices are challenged with correctly extracting such timing of the data stream due to jitter, noise, and other effects of the communication channel. Equalization (analog and decision feedback) is often employed, requiring adaptation during acquisition and steady state operation. These factors often dictate that SerDes receiver design, including the CDR circuit, be optimized for a given, relatively narrow range of data transfer rates. Consequently, many existing SerDes designs incorporate separate CDR circuitry to support such a wide range of data transfer rates as specified in USB3.

Backward compatibility for each new standard often requires the new devices operating with the standard support operation in accordance with previous versions of the standard. Unfortunately, to accommodate such a wide range of operating frequencies with USB1, USB2 and USB3, separate receivers operating in parallel is often required.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides for timing recovery in a receiver having a higher-rate sampling clock for sampling a higher-rate data stream and a lower-rate data stream includes oversampling, with a sampling module, the lower-rate data stream based on the higher rate sampling clock to provide blocks of samples. An edge detector detects one or more data symbol actual edges within the blocks of samples. A calculated edge for a current instant is generated based on i) an edge error and an edge distance between a previous instant and the current instant and ii) a calculated edge of the previous instant. An offset for the current instant is adjusted based on the calculated edge for the current instant; and data of a data symbol from the lower-rate data stream is detected from a sample identified by the adjusted offset for the current instant.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a transceiver, such as a universal serial bus (USB) transceiver, supports two or more rates, using an oversampling clock and data recovery (CDR) circuit for data recovery. The CDR circuit samples high rate data with a predetermined CDR sampling clock, and includes a timing recovery circuit that detects and accounts for extra or missing samples when oversampling the lower rate data with the predetermined CDR sampling clock. The timing recovery circuit employs an edge detector to detect each data symbol edge (first sample in a current instant block of the oversampled data symbol) and provide for an edge decision offset (number of samples to the approximate center of the oversampled data symbol) in a current instant block of samples. An actual edge and a calculated edge for a previous instant are compared to provide an edge error. An edge distance for the current instant is generated as the difference (or "distance") between actual edges of the current and previous instants. Filtered edge distance and filtered edge error are combined to generate a calculated edge position for the data symbol edge for the current instant. From this calculated edge (sample) position for the data symbol, the sample decision (edge) offset is applied to identify a sample value from which a decision can be generated for the data symbol to detect the current data value.

Figure 1:
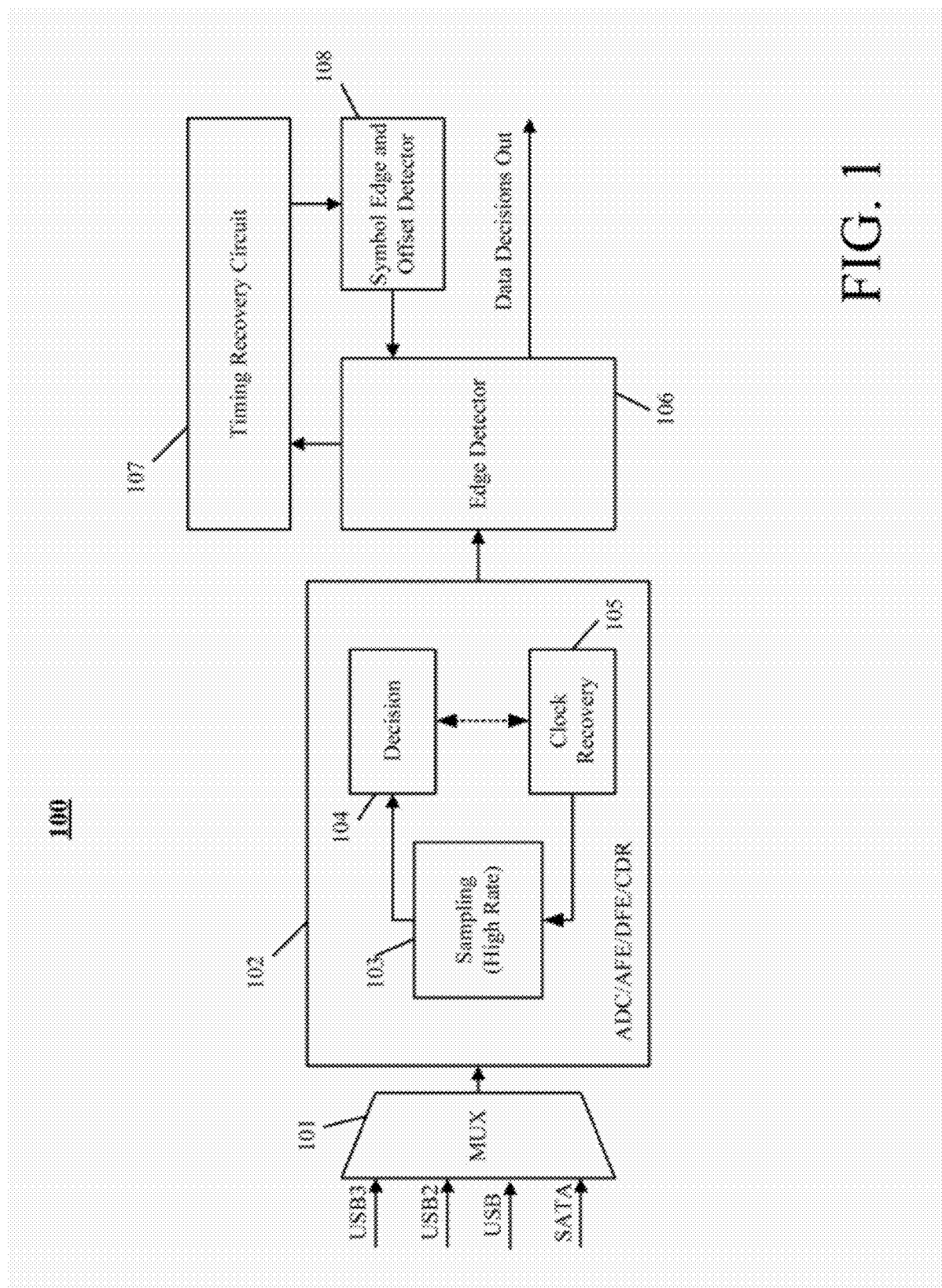
FIG. 1 shows a block diagram of communication system with timing recovery for oversampling operating in accordance with exemplary embodiments of the present invention.

FIG. 1 shows a block diagram of receiver system 100 operating in accordance with exemplary embodiments of the present invention. System 100 includes multiplexer (MUX) 101 that selects a given one of four input signal data streams, shown as USB3, USB2, USB (low and full speed) and SATA data streams, for data detection. System 100 further includes front end circuit 102 to perform analog-to-digital conversion (ADC) on the input signal, as well as apply equalization (e.g., analog front-end equalization (AFE) and/or decision feedback equalization (DFE)) to the input signal to correct for channel losses, dispersion and inter-symbol interference (ISI). Front end circuit 102 includes sampling module 103, decision circuit (e.g., a slicer) 104, and clock recovery 105. Sampling module 103 samples the input data to provide digital samples of data symbols at the highest rate, for example, the USB3 rate of an implementation. Decision circuit 104 compares the samples with a threshold to make a decision for a data symbol. Clock recovery 105 extracts timing information from the sampled input data to synchronize local clock signals to the input data to generate the sampling clock employed by sampling module 103 and for detecting the high rate data. Consequently, front end circuit 102 performs clock and data recovery (CDR) for the, for example, USB3 data stream. As shown in FIG. 1, decision circuit (e.g., a slicer) 104, and clock recovery 105 exchange information, or provide feedback, for tracking of sampling clock with respect to timing of the detected higher-rate data stream data clock when processing, for example, the USB3 data stream.

However, when processing lower-rate data streams (e.g., the USB2, USB (low and full speed) and SATA data streams) for data detection, the front end circuit 102 performs oversampling of these lower rate signals without necessarily performing other functions associated with the CDR. When processing lower-rate data streams for data detection, the front end circuit 102 causes clock recovery 105 to set the sampling clock rate to a predefined rate. The predefined rate is set to either i) the nominal higher-rate data stream data clock rate or some user-defined clock rate. Under such circumstances, timing extraction from the data stream is not necessarily performed, and so decision feedback, tracking, and other CDR functions might be disabled.

The oversampled data stream for lower rates is applied to edge detector 106, timing recovery circuit 107, and symbol edge and offset detector 108 (described below in detail). Edge detector 106 receives data symbol samples from the input data stream and detects symbol transitions, or edges, between data symbols. Based on the actual detected edges between data symbols, symbol edge and offset detector 108 applies an offset within the sample value positions to select a sample value corresponding to the relative center of the data symbol. From this offset sample value, a decision might be made as to the data value of the data symbol. However, since the timing of the input data stream might vary in comparison to the decimated sampling clock timing (of, e.g., sampling module 103), the offset might vary. Timing recovery circuit 107, based on the output of edge detector 106, determines this variation in timing and calculates an associated correction to the offset. Therefore, symbol edge and offset detector 108, based on the correction, adjusts its offset to account for the variation in timing between the sampling clock and input data stream.

For an exemplary USB system supporting an integrated USB2 and USB3 physical layer (PHY), MUX 101 is employed to select one of the four input signal data streams, shown as USB3, USB2, USB (low and full speed) and SATA data streams, for data detection. When selected for USB3, front end circuit 102 operates normally, sampling at the USB3 data at the USB3 baud rate. When selected for USB2, front end circuit 102 operates so as to oversample the 480 MHz USB2 data at ten-times, or "10×", data rate to produce a 4.8 GHz output, and operates so as to oversample the 12 MHz full speed USB data at 400× rate to produce a 4.8 GHz output. For low speed USB data, oversampling might occur at 3200× rate. When processing the data rates lower than USB3, front end circuit 102 operates in a low power mode, allowing for pass-through for the CDR, AFE and DFE processing, thereby consuming less circuit and processing power. Once the symbol edge is determined, the symbol is sampled by selecting an oversampled bit in an oversampling block with a pre-calculated offset. The offset for high-speed USB2 mode is 5 bits, the offset for full speed USB mode is 200 bits, and the offset for full speed USB mode is 1600 bits. Output symbol decision data might be decimated for some embodiments depending on the amount of oversampling of the lower rate data.

Figure 2:
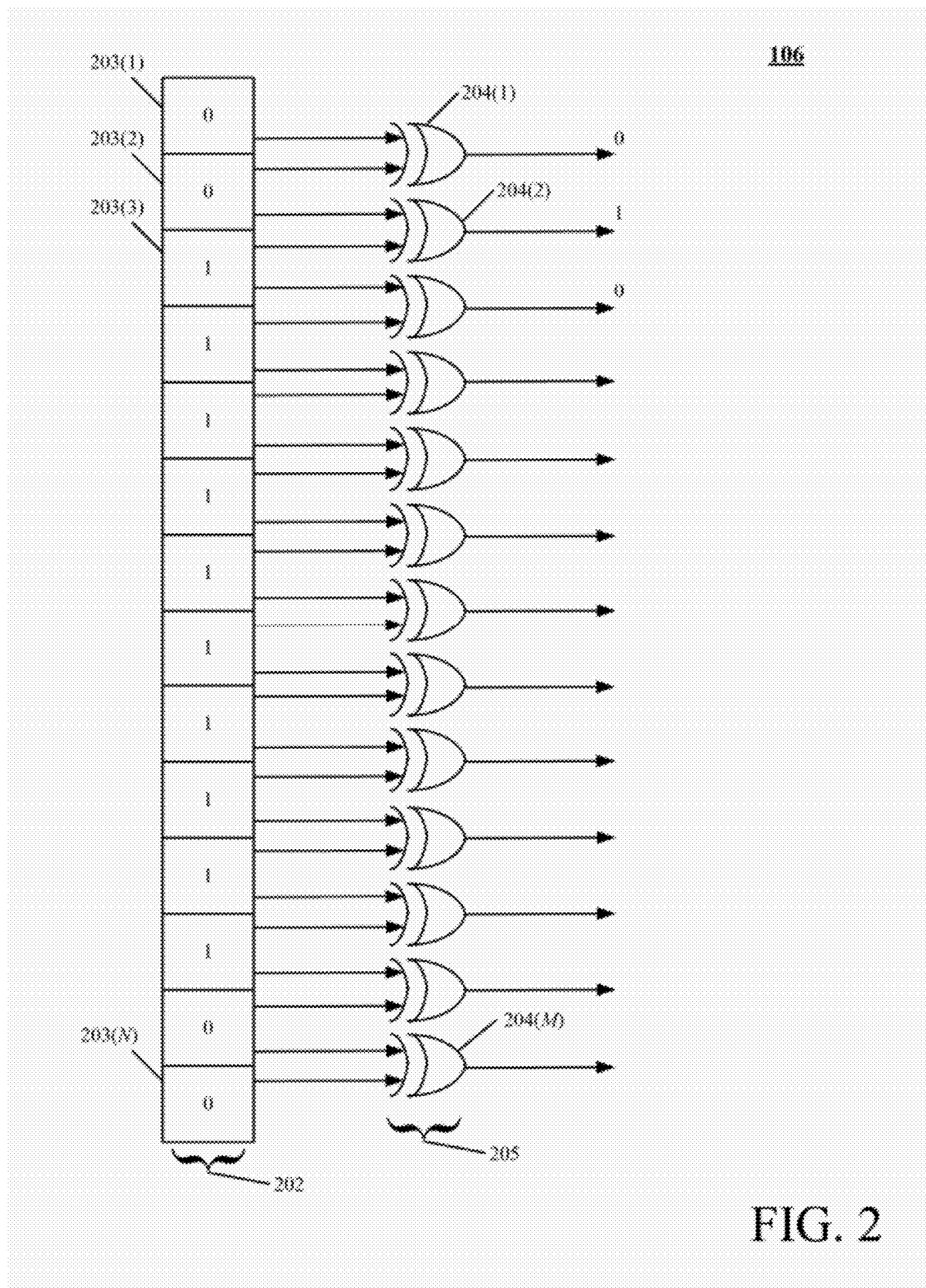
FIG. 2 shows an exemplary edge detector for the communication system of FIG. 1.

FIG. 2 shows an exemplary edge detector 106 of FIG. 1, which might be implemented as a parallel bus edge detector. Edge detector 106 receives a sequence of data values into buffer 202 having latches 203(1)-203(N). Logic circuitry 205 of XOR gates 204(1)-204(M) receives pair-wise, adjacent data values of the sequence from buffer 202. For the exemplary embodiment of FIG. 2, N is 14, and M is 13, but other buffer sizes and numbers of XOR gates might be employed depending on implementation considerations. In operation, for example, XOR gate 204(1) receives the data values in latches 203(1) and 203(2), but since the data values in latches 203(1) and 203(2) are equivalent, the output of XOR 204(1) is "0", indicating no transition, and thus no edge is present. XOR gate 204(2) receives the data values in latches 203(2) and 203(3), and since the data values in latches 203(1) and 203(2) are different, the output of XOR 204(1) is "1", indicating a transition, and thus, an edge is present at that sample position. In general, an edge is detected (a "detected edge value" or simply "edge") if the sequence values change from a logic "0" to logic "1", or from a logic "1" to logic "0", and a decision for a symbol might occur offset in time from the detected edge (shown as a symbol decision offset of five values in FIG. 2).

Figure 3:
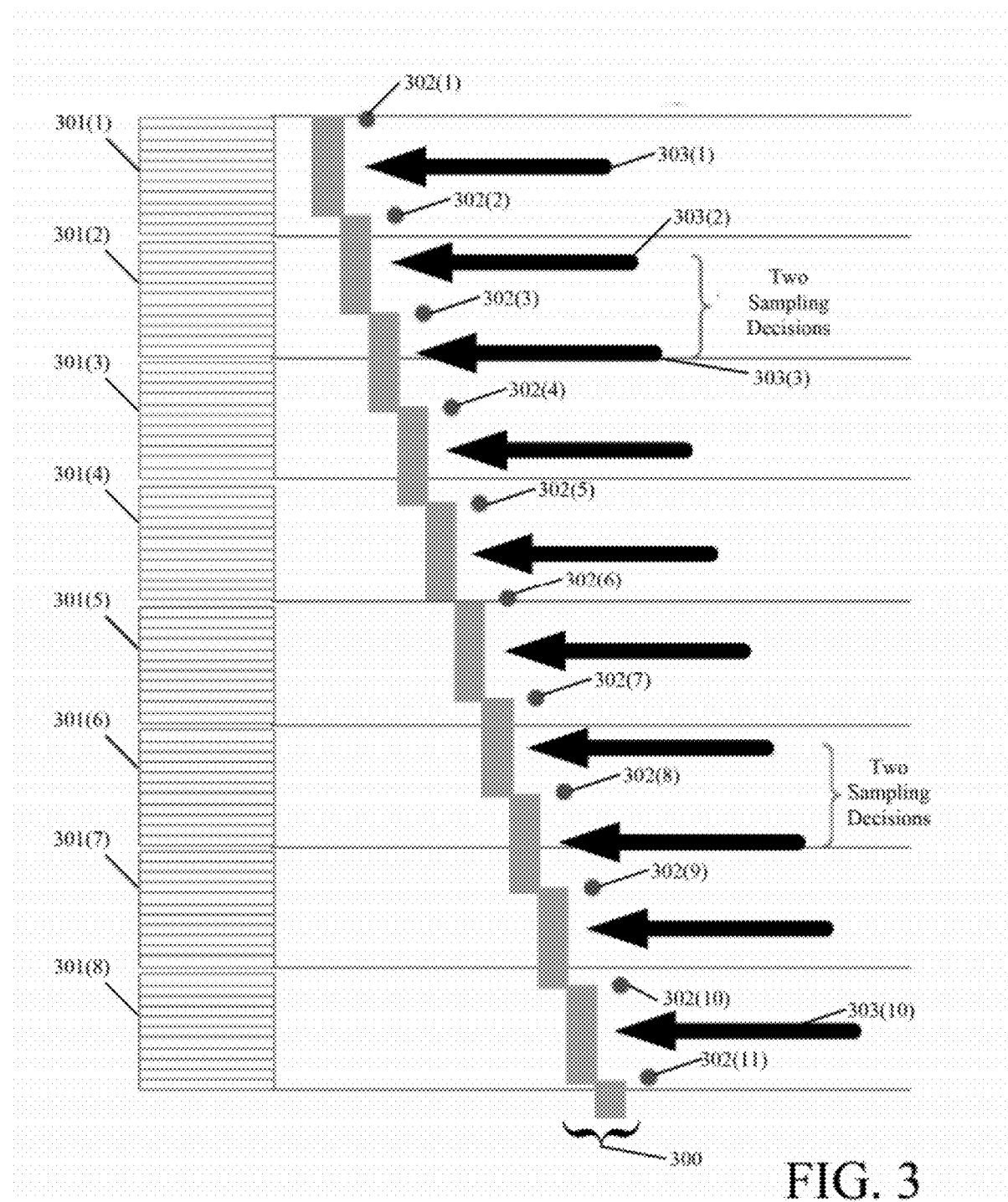
FIG. 3 shows an example of operation without timing recovery for timing mismatch between faster incoming data and 10× sampling of the incoming data yielding two samplings in a data eye.
Figure 4:
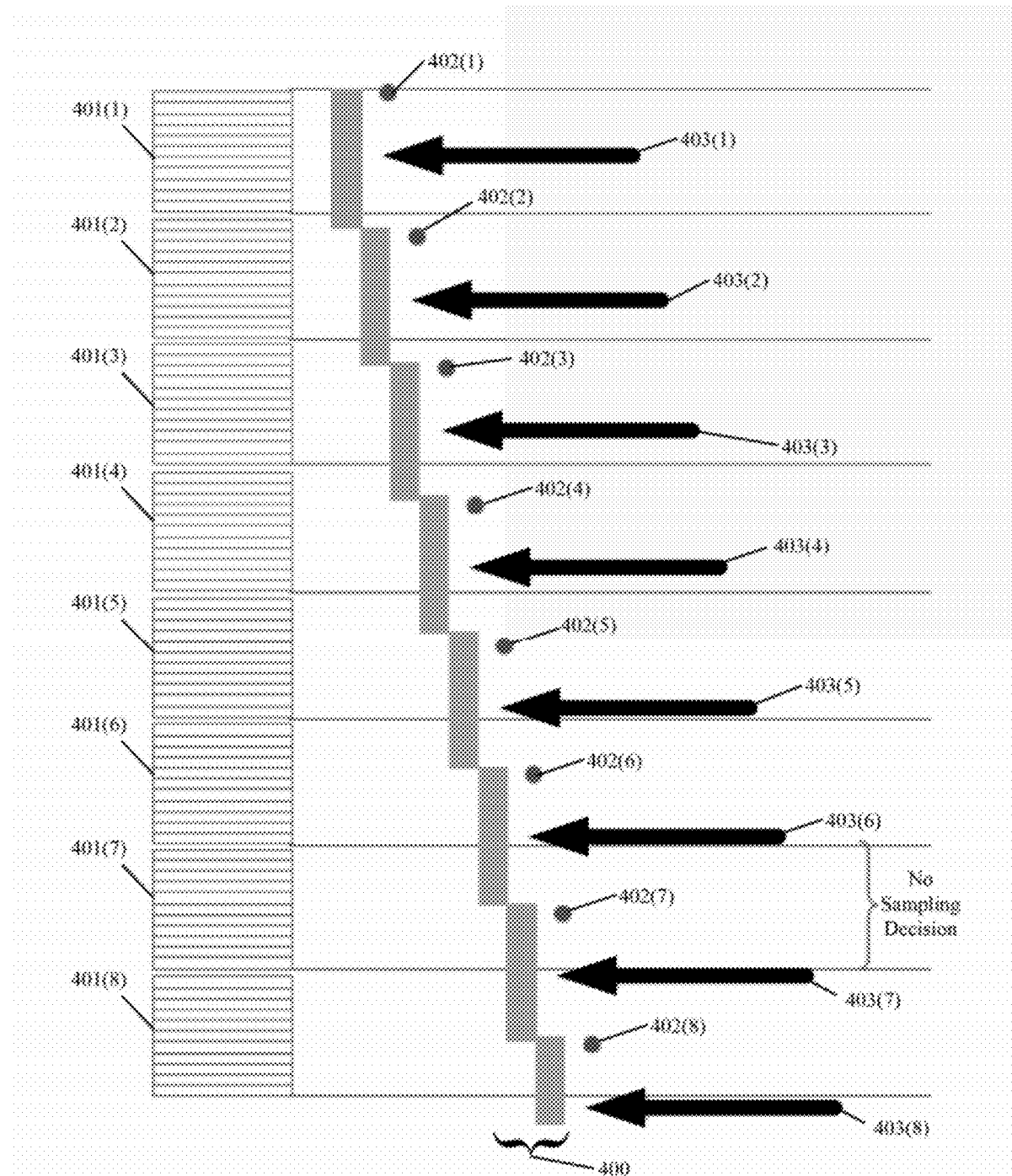
FIG. 4 shows an example of operation without timing recovery for timing mismatch between slower incoming data and 10× sampling of the incoming data yielding missed samplings in a data eye.

Examples of operation without timing recovery for mismatch between sampling of a CDR circuit and the incoming data are shown in FIG. 3 (incoming data clock slightly faster than 10× sampling) and FIG. 4 (incoming data slower than 10× sampling). As shown in FIGS. 3 and 4, 10× oversampling of an incoming data symbol value generates a 10-sample (or 10-bit) block of values corresponding to a single incoming data symbol value period.

FIG. 3 shows a sequence 300 of data symbols received with a data rate that is slightly faster than $1/10^{th}$ of the 10× sampling rate. Sampling generates a series of 10-bit blocks 301(1)-301(8). Each data symbol in sequence 300 has a corresponding edge, shown as edges 302(1)-302(11). Decisions for samples are ideally made at the approximate centers of the data symbols, shown as decision points 303(1)-303(10). Since each received data symbol is slightly less than the 10-bit block period, each 10-bit block contains less than ten samples of the current data symbol and an increasing number of sample values of the next data symbol. As shown in FIG. 3 between edges 302(2) and 302(4), and between edges 302(7) and 302(9), if the incoming data rate is faster than 10× sampling, occasionally two sampling decisions would occur during a single 10-bit block.

FIG. 4 shows a sequence 400 of data symbols received with a data rate that is slightly slower than $1/10^{th}$ of the 10× sampling rate. Sampling generates a series of 10-bit blocks 401(1)-401(8). Each data symbol in sequence 400 has a corresponding edge, shown as edges 402(1)-402(8). Decisions for samples are ideally made at the approximate centers of the data symbols, shown as decision points 403(1)-403(8). Since each received data symbol is slightly more than the 10-bit block period, each 10-bit block contains ten samples of the current data symbol and the subsequent block contains an increasing number of sample values of the previous data symbol. As shown in FIG. 4 between edges 402(6) and 402(8), if the incoming data rate is slower than 10× sampling, occasionally no sampling decision occurs during a single 10-bit block.

Figure 5:
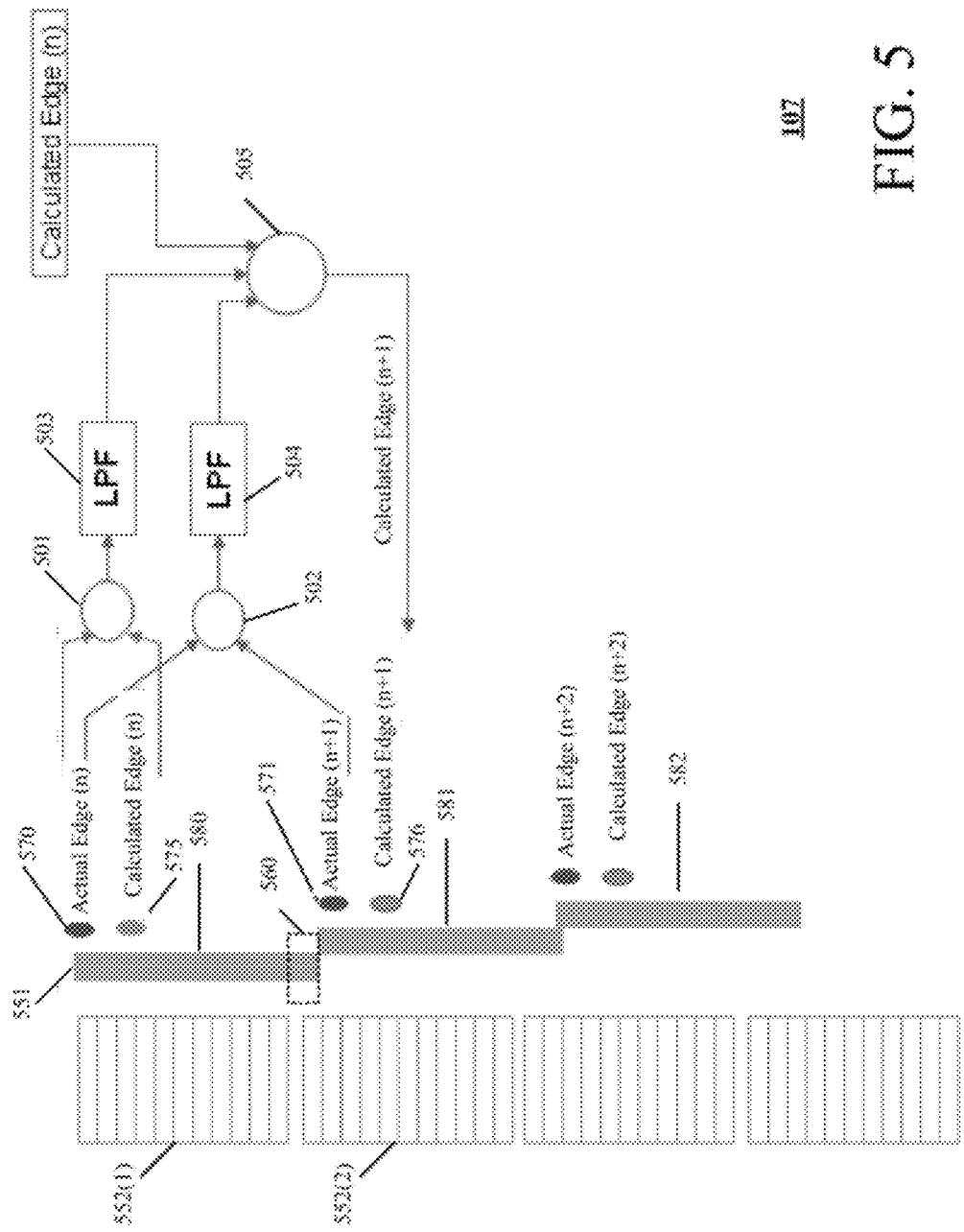
FIG. 5 shows an exemplary timing recovery circuit of FIG. 1 operating in accordance with embodiments of the present invention.

FIG. 5 shows an exemplary timing recovery circuit 107 of FIG. 1 operating in accordance with embodiments of the present invention. Timing recovery circuit 107 comprises combiners 501 and 502, low pass filters (LPFs) 503 and 504, and combiner 505. Operation of timing recovery circuit 107 in the presence of data with 10× oversampling is now described.

Data value 551 is over-sampled at a 10× rate into sample block 552(1) of ten samples at time n (as employed herein, at a first instant). As shown, sampling is faster than the incoming data rate, so a portion 560 of the data symbol extends into sampling block 552(2) at time n+1 (a second instant). Edge detector 106 (not shown in the FIG. 5) detects actual edge 570 at time n, and the CDR circuit operates to make a data decision at sample point 580. Timing recovery circuit 107 then employs the actual and calculated edges at the previous instant (e.g., instant n) along with the detected actual edge 571 at the current instant (n+1) to generate a calculated edge at the current instant. The CDR circuit then operates to make a data decision at sample point 581. In this timing recovery circuit loop, the calculated symbol edge is determined by adding the filtered edge distance and filtered edge error to the previously calculated edge. This filtering tracks the parts per million (ppm) differences between the incoming data rate and the fixed oversampling clock. The CDR circuit then uses this calculated edge value with a symbol decision edge offset to make a decision for the current symbol's data value (e.g., sample point 581 at instant n+1).

Initially, calculated edge 575 (e.g., at instant n) is set to the actual edge or some pre-defined offset. A calculated edge (e.g., calculated edge 576 at instant n+1) is subsequently determined as follows. A filtered edge error is calculated by i) combining actual and calculated edge values at the previous instant in combiner 501, and ii) low pass filtering the result in LPF 503. A filtered edge distance between the current and previous instants is calculated by i) combining actual edge values at the previous and current instants in combiner 502, and ii) low pass filtering the result in LPF 504. The filtered edge distance and filtered edge error are added to the previously calculated edge in combiner 505 to generate the calculated edge for the current instant. Note that low pass filtering of values provides the mean of the associated value.

One skilled in the art might readily modify embodiments of the present invention beyond edge values from the current and previous instants to use edge values from other instants. Further, embodiments of the present invention might employ weighting one or more of the various edge values, or might employ adaptive techniques for tracking changes in incoming data rates to pre-adjust edge and symbol decision offset values used.

A transceiver operating in accordance with one or more embodiments of the present invention might provide for the following advantages. The transceiver might exhibit increased performance by enhanced timing recovery, thereby avoiding slips that generate bursts of bit errors, that might cause loss of lock of the sampling clock to the input data stream, and that might cause sub-optimal symbol decision timing. Consequently, such transceiver might exhibit increased speed and reliability in unfavorable communication environments.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of timing recovery in a receiver having a higher-rate sampling clock for sampling a higher-rate data stream and a lower-rate data stream, the method comprising:
   oversampling, with a sampling module, the lower-rate data stream based on the higher-rate sampling clock to provide blocks of samples;
   detecting, with an edge detector, one or more data symbol actual edges within the blocks of samples;
   generating a calculated edge for a current instant based on i) an edge error and an edge distance between a previous instant and the current instant and ii) a calculated edge of the previous instant, wherein generating the calculated edge comprises:
      generating the edge error for the current interval as a combination of an actual edge and a calculated edge of the previous interval;
      generating the edge distance for the current interval as a combination of the actual edge of the previous interval and an actual edge of the current interval; and
      combining the edge error and the edge distance for the current instant with the calculated edge of the previous instant, thereby generating the calculated edge for the current instant;
   adjusting an offset for the current instant based on the calculated edge for the current instant; and
   detecting data of a data symbol from a sample identified by the adjusted offset for the current instant.

2. The method of claim 1, further comprising filtering the edge error and filtering the edge distance.

3. The method of claim 1, further comprising selecting either the higher-rate data stream or the lower-rate data stream for processing, wherein, when selecting the lower-rate data stream for processing, the method sets the higher-rate sampling clock to a predefined rate.

4. The method of claim 3, wherein, when selecting the lower-rate data stream, the method further comprises adjusting operation of at least one of gain control, equalization and clock and data recovery of the receiver.

5. The method of claim 3, wherein, when selecting the lower-rate data stream, the method further comprises adjusting operation of the receiver to a low-power mode.

6. The method of claim 1, further comprising repeating the method over subsequent instants, thereby generating a sequence of detected data.

7. The method of claim 6, further comprising decimating the sequence of detected data.

8. The method of claim 1, wherein the higher-rate data stream conforms to a Universal Serial Bus version 3 (USB3) specification, and the lower-rate data stream conforms to at least one of a USB2 specification, low rate USB 1 specification, high rate USB 1 specification, and Serial Advanced Technology Attachment (SATA) specification.

9. The method of claim 1, wherein the method is implemented as steps by a Serializer-Deserializer (SerDes) device.

10. An apparatus for timing recovery in a receiver having a higher-rate sampling clock for sampling a higher-rate data stream and a lower-rate data stream, the apparatus comprising:
   a sampling module configured to oversample the lower-rate data stream based on the higher-rate sampling clock to provide blocks of samples;
   an edge detector comprising one or more latches and one or more logic gates, the edge detector configured to detect one or more data symbol actual edges within the blocks of samples;
   a timing recovery circuit configured to generate a calculated edge for a current instant based on i) an edge error and an edge distance between a previous instant and the current instant and ii) a calculated edge of the previous instant, wherein the timing recovery circuit is configured to adjust an offset for the current instant based on the calculated edge for the current instant, wherein:
      the timing recovery circuit generates the edge error for the current interval as a combination of an actual edge and a calculated edge of the previous interval;
      the timing recovery circuit generates the edge distance for the current interval as a combination of the actual edge of the previous interval and an actual edge of the current interval; and
      the timing recovery circuit combines the edge error and the edge distance for the current instant with the calculated edge of the previous instant, thereby generating the calculated edge for the current instant; and wherein data of a data symbol is detected from a sample identified by the adjusted offset for the current instant.

11. The apparatus of claim 10, wherein the timing recovery circuit is further configured to filter the edge error and filter the edge distance.

12. The apparatus of claim 10, further comprising a multiplexor (MUX) configured to select either the higher-rate data stream or the lower-rate data stream for processing by the receiver, wherein, when selecting the lower-rate data stream for processing, the receiver sets the higher-rate sampling clock to a predefined rate.

13. The apparatus of claim 12, wherein, when the MUX selects the lower-rate data stream, the receiver adjusts operation of at least one of a gain control, an equalization, and a clock and data recovery of the receiver, thereby adjusting operation of the receiver to a low-power mode.

14. The apparatus of claim 10, further comprising a decimator configured to decimate a sequence of detected data generated over a plurality of instants.

15. The method of claim 10, wherein the higher-rate data stream conforms to a Universal Serial Bus version 3 (USB3) specification, and the lower-rate data stream conforms to at least one of a USB2 specification, low rate USB 1 specification, high rate USB 1 specification, and Serial Advanced Technology Attachment (SATA) specification.

16. The apparatus of claim 10, wherein the apparatus is embodied in a Serial DeSerializer (SerDes) device.

17. The apparatus of claim 10, wherein the apparatus is embodied in a Universal Serial Bus (USB) device.

18. A machine-readable, non-transitory storage medium, having encoded thereon program code, wherein, when the program code is executed by a machine, the machine implements a method for timing recovery in a receiver having a higher-rate sampling clock for sampling a higher-rate data stream and a lower-rate data stream, the method comprising the steps of:

oversampling, with a sampling module, the lower-rate data stream based on the higher-rate sampling clock to provide blocks of samples;

detecting, with an edge detector, one or more data symbol actual edges within the blocks of samples;

generating a calculated edge for a current instant based on i) an edge error and an edge distance between a previous instant and the current instant and ii) a calculated edge of the previous instant, wherein generating the calculated edge comprises:

generating the edge error for the current interval as a combination of an actual edge and a calculated edge of the previous interval;

generating the edge distance for the current interval as a combination of the actual edge of the previous interval and an actual edge of the current interval; and combining the edge error and the edge distance for the current instant with the calculated edge of the previous instant, thereby generating the calculated edge for the current instant;

adjusting an offset for the current instant based on the calculated edge for the current instant; and detecting data of a data symbol from a sample identified by the adjusted offset for the current instant.

* * * * *